United States Patent
Anandan

(10) Patent No.: US 10,412,588 B1
(45) Date of Patent: Sep. 10, 2019

(54) UNIFIED DATA REPOSITORY PROXY

(71) Applicant: Cisco Technology, Inc., San Jose, CA (US)

(72) Inventor: Swapna Anandan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/245,809

(22) Filed: Jan. 11, 2019

(51) Int. Cl.
| | |
|---|---|
| *H04M 1/66* | (2006.01) |
| *H04W 12/08* | (2009.01) |
| *H04W 12/00* | (2009.01) |
| *H04W 8/20* | (2009.01) |
| *H04L 29/06* | (2006.01) |
| *H04L 29/08* | (2006.01) |
| *H04W 12/06* | (2009.01) |
| *H04W 84/04* | (2009.01) |

(52) U.S. Cl.
CPC ........ *H04W 12/0802* (2019.01); *H04L 63/10* (2013.01); *H04L 67/2814* (2013.01); *H04W 8/20* (2013.01); *H04W 12/0027* (2019.01); *H04W 12/00514* (2019.01); *H04W 12/06* (2013.01); *H04W 84/042* (2013.01)

(58) Field of Classification Search
CPC ........ H04W 12/0802; H04W 12/0027; H04W 84/042
USPC ............................ 455/411, 414.1, 412.1, 418
See application file for complete search history.

(56) References Cited

U.S. PATENT DOCUMENTS

| | | | |
|---|---|---|---|
| 8,914,342 B2 | 12/2014 | Kalaboukis et al. | |
| 8,929,859 B2 | 1/2015 | McNamee et al. | |
| 9,270,709 B2 | 2/2016 | Shatzkamer et al. | |
| 9,432,841 B2 | 8/2016 | Mantynen | |
| 2007/0073715 A1* | 3/2007 | Tang | G06F 16/275 |
| 2014/0018036 A1* | 1/2014 | Lehane | H04W 4/24 |
| | | | 455/406 |
| 2015/0201371 A1* | 7/2015 | Tamura | H04W 48/16 |
| | | | 370/259 |

(Continued)

OTHER PUBLICATIONS

3GPP Organizational Partners, "3rd Generation Partnership Project; Technical Specification Group Services and System Aspects; System Architecture for the 5G System; Stage 2 (Release 15)", 3GPP TS 23.501 V15.3.0, Sep. 2018, 226 pages.

(Continued)

*Primary Examiner* — Nghi H Ly
(74) *Attorney, Agent, or Firm* — Edell, Shapiro & Finnan, LLC

(57) ABSTRACT

A Unified Data Repository (UDR) proxy obtains first subscriber data from a first UDR of a first network operator, second subscriber data from a second UDR of a second network operator, and third subscriber data from a third UDR of an enterprise. The UDR proxy stores the first subscriber data, the second subscriber data, and the third subscriber data locally. The UDR proxy obtains a request to access a network asset that is accessible through the first network operator. Based on the first subscriber data, the second subscriber data, and the third subscriber data stored locally, the UDR proxy attempts to determine whether the request to access the network asset is authorized to access the network asset. In response to determining that the request to access the network asset is authorized, the UDR proxy permits access to the network asset.

20 Claims, 4 Drawing Sheets

(56) References Cited

U.S. PATENT DOCUMENTS

2017/0104609 A1    4/2017  McNamee et al.

OTHER PUBLICATIONS

3GPP Organizational Partners, "3rd Generation Partnership Project; Technical Specification Group Core Network and Terminals; 5G System; Unified Data Management Services; Stage 3 (Release 15)", 3GPP TS 29.503 V15.1.0, Sep. 2018, 154 pages.

\* cited by examiner

UNIFIED DATA REPOSITORY PROXY

TECHNICAL FIELD

The present disclosure relates to mobile communications.

BACKGROUND

"5G" is the next generation of cellular mobile communications, succeeding 4G. The 3rd Generation Partnership Project (3GPP) Technical Specification (TS) 23.501 defines a Unified Data Repository (UDR) that stores, consolidates, and manages user/subscriber data. The UDR supports the following functionality: (1) storage and retrieval of subscription data by a Unified Data Management (UDM) or Policy Control Function (PCF); and (2) storage and retrieval of data for exposure and application data.

The Home Location Register (HLR) and Subscriber Profile Repository (SPR) were the 4G Long-Term Evolution (LTE) predecessors of the UDR. Unlike the HLR and SPR, which collectively included multiple copies of a subscriber database, the UDR is centralized and is located in the same Public Land Mobile Network (PLAIN) as the Network Function (NF) service consumption. 5G also offers a network slicing capability which could be served across multiple networks owned and hosted by edge network providers, cloud service providers, and mobile network operators.

DESCRIPTION OF EXAMPLE EMBODIMENTS

Overview

In one example, a Unified Data Repository (UDR) proxy obtains first subscriber data from a first UDR of a first network operator, second subscriber data from a second UDR of a second network operator, and third subscriber data from a third UDR of an enterprise. The UDR proxy stores the first subscriber data, the second subscriber data, and the third subscriber data locally. The UDR proxy obtains a request to access a network asset that is accessible through the first network operator. Based on the first subscriber data, the second subscriber data, and the third subscriber data stored locally, the UDR proxy attempts to determine whether the request to access the network asset is authorized to access the network asset. In response to determining that the request to access the network asset is authorized, the UDR proxy permits access to the network asset.

Example Embodiments

Figure 1:
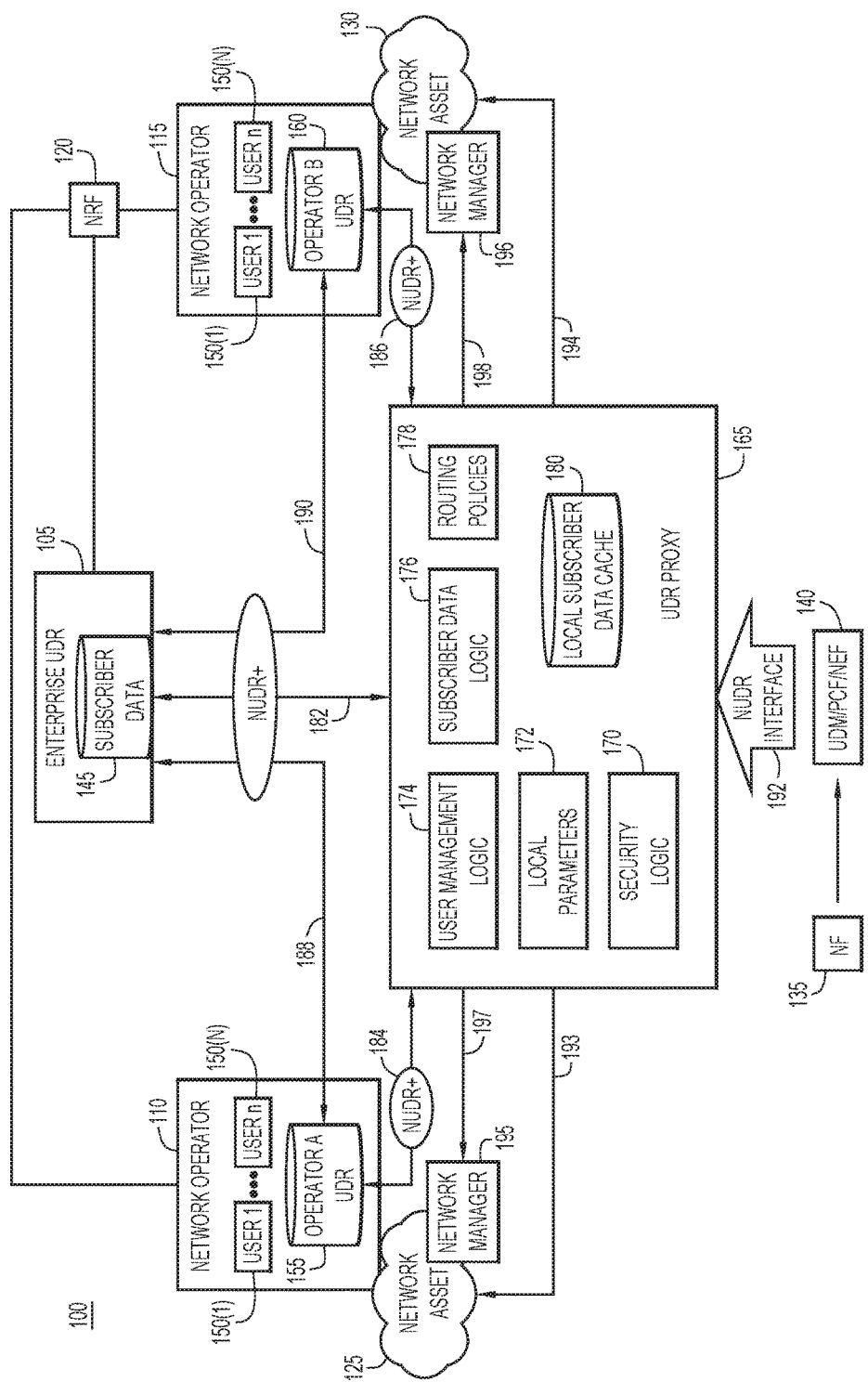
FIG. 1 illustrates a system implementing a Unified Data Repository (UDR) proxy, according to an example embodiment.

FIG. 1 illustrates an example system 100 for a Unified Data Repository (UDR) proxy implementation in a mobile core network. System 100 includes enterprise UDR 105, network operators 110 and 115, and Network Repository Function (NRF) 120. Enterprise UDR 105 may be associated with (managed by) an enterprise. One example of an enterprise is an Original Equipment Manufacturer (OEM) (e.g., a smart car manufacturer). Network operators 110 and 115 may be respective service providers configured to provide wireless wide area (e.g., 5G) network connectivity to an enterprise User Element (UE) (e.g., a smart car). An enterprise UE may, for example, be connected to the coverage area provided by network operator 110. Enterprise UDR 105 and network operators 110 and 115 may register with NRF 120 in order to participate in the wireless wide area network. Network operators 110 and/or 115 may be service providers (e.g., running a Radio Access Network (RAN)) or cloud providers (e.g., running a service analytics engine).

System 100 further includes network assets 125 and 130, Network Function (NF) 135, and Unified Data Management (UDM)/Policy Control Function (PCF)/Network Exposure Function (NEF) 140 (referred to hereafter as UDM 140). Network assets 125 and 130 may include data. NF 135 may be any suitable entity configured to request data (e.g., from network assets 125 and/or 130). For example, NF 135 may be associated with (managed by) the enterprise, network operator 110, network operator 115, network asset 125, network asset 130, or an entity that is not shown in FIG. 1. UDM 140 is configured to provide the request (e.g., Hypertext Transfer Protocol (HTTP) request) from NF 135 toward the appropriate destination (e.g., network asset 125 and/or network asset 130).

Enterprise UDR 105 includes subscriber data 145. Subscriber data 145 may include information identifying one or more users (e.g., UEs) authorized to utilize network assets 125 and/or 130. For example, those users indicated as having an active subscription may access network assets 125 and/or 130 through network operators 110 and/or 115. Network operators 110 and 115 include identifications of users 150(1)-150(N) as well as respective UDRs 155 and 160. UDRs 155 and 160 may include subscription information that overlaps with subscriber data 145. For example, subscriber data 145 may include an indication that users 150(1)-150(N) are associated with enterprise 145.

It may be desired for the enterprise to deploy a vertical-specific use case or horizontal use case leveraging best-in-class network and cloud resources available across network operators 110 and 115. As such, enterprise subscribers (e.g., users 150(1)-150(N)) need the ability to access network resources (e.g., network assets 125 and 130) from multiple service providers (e.g., network operators 110 and 115) seamlessly. For instance, a smart car may initially use network operator 110, and subsequently need to switch over to network operator 115.

Conventionally, however, UDRs 155 and 160 would be isolated (e.g., self-sufficient and closed). As such, network operators 110 and 115 would offer subscription services only for its own network resources. Isolated UDRs are expensive and inefficient options for the enterprise, particularly where the enterprise has similar and dynamic subscription requirements across network operators 110 and 115. Accordingly, UDR proxy 165 is provided to improve the efficiency (e.g., latency) of system 100. Briefly, UDR proxy 165 may control access over the storage and retrieval of subscription data from multiple UDR clusters located remotely from geographically distributed users. In particular, UDR proxy 165 may use subscriber data stored locally to determine whether a particular request from NF 135 should be granted.

To that end, UDR proxy 165 includes security logic 170, local parameters 172, user management logic 174, subscriber data logic 176, routing policies 178, and local subscriber data cache 180. Security logic 170 may include logic for one or more security policies (e.g., permitting/denying one or more users 150(1)-150(N) access to network asset 125/130). Local parameters 172 may specify local network capabilities/attributes/policies to enable access control. User management logic 174 may enable UDR proxy 165 to analyze local subscriber data to determine how to handle a request from NF 135. Routing policies 178 may enable conditional routing of the access request to one or more backend UDR clusters deployed in a distributed environment (e.g., enterprise UDR 105 and/or UDRs 155/160). Local subscriber data cache 180 may include local subscriber data corresponding to the UE and applications associated with a network identity (e.g., subscriber data, policy data, exposure data, application data, etc.).

UDR proxy 165 may obtain subscriber data from UDR 155, subscriber data from UDR 160, and subscriber data 145 from enterprise UDR 105. The subscriber data from UDR 155, subscriber data from UDR 160, and/or subscriber data 145 may or may not have overlapping subscriber data/information. UDR proxy 165 may obtain the subscriber data from enterprise UDR 105, network operator 110, and network operator 115 via Nudr/Nudr+ interfaces 182, 184, and 186, respectively. Schema mapping of the subscriber data may enable viewability of the distributed backend UDR data information mapped as a subscriber tree based on enterprise and network identities.

In one example, enterprise UDR 105 is configured to communicate with at least one of UDRs 155 and 160. UDR proxy 165 may obtain subscriber data from UDR 155, subscriber data from UDR 160, and subscriber data 145 in response to requests sent to UDR 155, UDR 160, and enterprise UDR 105. Additionally/alternatively, UDR proxy 165 may obtain subscriber data from UDR 155, subscriber data from UDR 160, and subscriber data 145 periodically or by any other suitable mechanism. In one example, UDR 105 is also configured to communicate with UDRs 155 and 160 via Nudr/Nudr+ interfaces 188 and 190, respectively. This may enable enterprise UDR 105 to share subscriber data 145 with UDRs 155 and 160, and UDRs 155 and 160 to share their respective subscriber data with enterprise UDR 105.

UDR proxy 165 may store the subscriber data from UDR 155, the subscriber data from UDR 160, and subscriber data 145 locally (e.g., in local subscriber data cache 180). Subsequently, UDR proxy 165 may obtain, from NF 135, a request to access network asset 125 (for example), which is accessible through network operator 110. UDR proxy 165 may obtain the request via UDM 140 through Nudr/Nudr+ interface 192. UDR proxy 165 may have Application Programming Interfaces (APIs) that allow direct management and access interfaces to be used by UDM 140 to access a particular set of data stored in UDR 155, the subscriber data from UDR 160, and subscriber data 145, which may be located in geographically remote spaces. Based on the subscriber data from UDR 155, the subscriber data from UDR 160, and subscriber data 145 stored locally, UDR proxy 165 may attempt to determine whether the request to access network asset 125 is authorized (e.g., whether the user associated with the request is an authorized network user).

UDR proxy 165 may determine whether the request to access network asset 125 is authorized. For example, UDR proxy 165 may perform a multi-stage authentication and authorization process using subscriber data 145, the subscriber data obtained from UDRs 155/160, and/or source and management information obtained from local or remote sources. UDR proxy 165 may use subscriber data 145 (and any subscriber data obtained from UDRs 155 and/or 160) to determine whether the request to access network asset 125 is authorized. In response to determining that the request to access network asset 125 is not authorized, UDR proxy 165 may deny access to network asset 125 (e.g., by ignoring the request, rejecting the request, generating an error message, and/or initiating an access violation response).

Alternatively, in response to determining that the request to access network asset 125 is authorized, UDR proxy 165 may permit access to network asset 125. In one example, UDR proxy 165 permits access (e.g., conditionally routes the request) to network assets 125 and/or 130 directly, as represented by arrows 193 and 194. UDR proxy 165 may thereby authorize one or more network users by assigning and enforcing security policies. UDR proxy 165 may also add additional local attributes such as re-direct Uniform Resource Locators (URLs) based on the access request. UDR proxy 165 may enable access to authentication data, authorization data, access and mobility subscription data, network function subscription data, local operator specific data, Simple Messaging Service (SMS) management data, and/or notification data. In one example, UDR proxy 165 may be configured to control access to at least one resource at both the application level and the UE level.

In another example, UDR proxy 165 permits access to network assets 125 and/or 130 via network managers 195 and 196, respectively (arrows 197 and 198). In one specific example, network managers 195 and 196 are instantiations of Cisco Systems, Inc.'s Digital Network Architecture Center. Network managers 195 and 196 may serve as network connectors that extend the enterprise (private) network. Thus, network managers 195 and 196 may enable connectivity by acting as enterprise network entry points. Network managers 195 and 196 may be locally situated.

In certain situations, UDR proxy 165 may be unable to determine whether the request to access the network asset is authorized. For example, local subscriber data cache 180 may not include subscriber data pertaining to a user associated with the request, or the subscriber data may be expired. If it cannot be determined whether the request to access network asset 125 is authorized based on local subscriber data cache 180, UDR proxy 165 may redirect the request to enterprise UDR 105 and/or UDR 155 (for example). For instance, if UDR proxy 165 redirects the request to enterprise UDR 105, enterprise UDR 105 may determine whether the request to access the network asset is authorized based on subscriber data 145. Enterprise UDR 105 may thereafter handle the request directly (e.g., by permitting access) or providing an indication to UDR proxy 165 that the request to access network asset 125 is authorized. In a system having multiple UDR proxies, UDR proxy 165 may also redirect the request to another UDR proxy.

Figure 2:
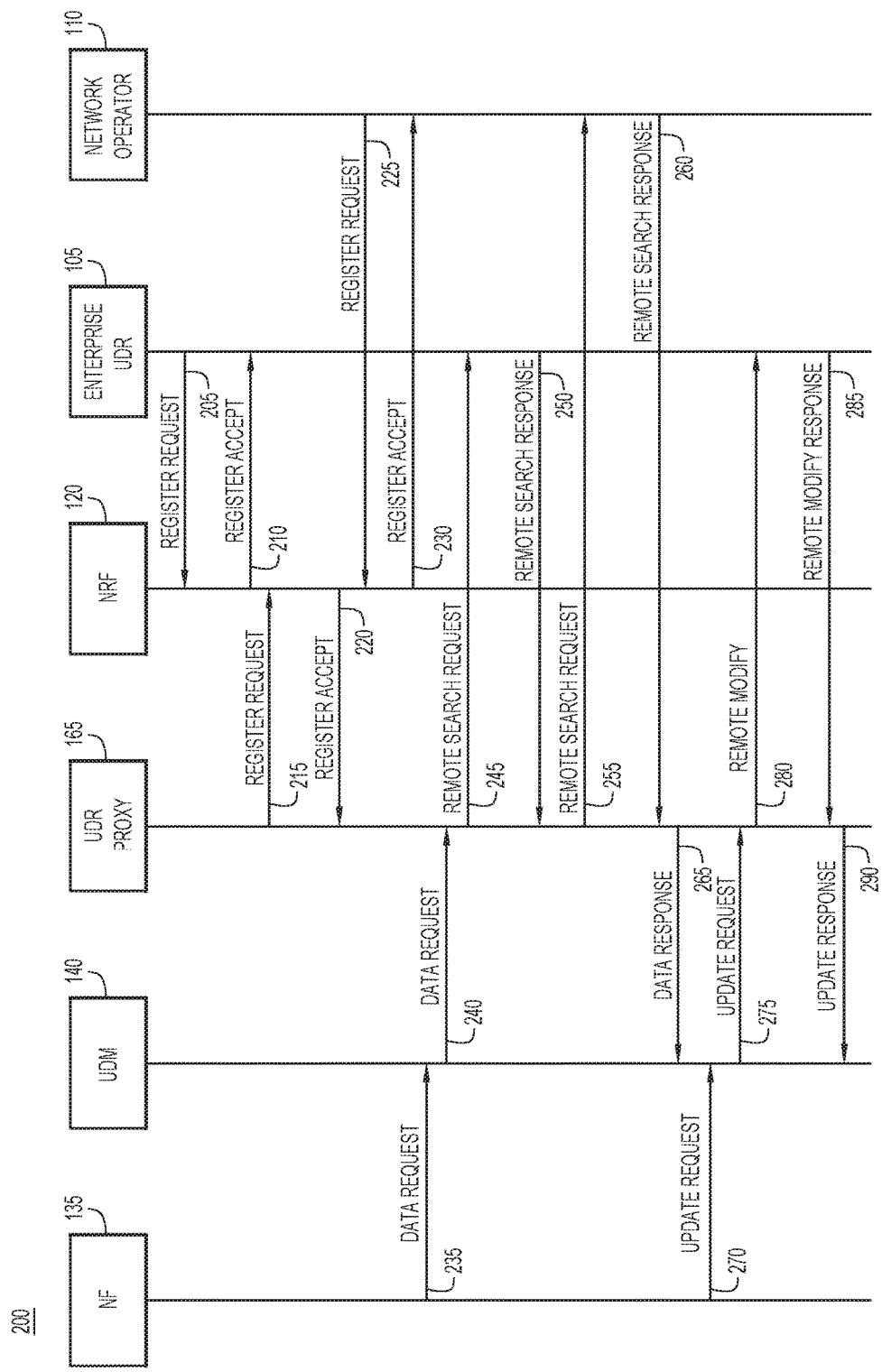
FIG. 2 illustrates a call flow involving a UDR proxy, according to an example embodiment.

FIG. 2 illustrates an example call flow 200 involving UDR proxy 165. Reference is also made to FIG. 1 in connection with the description of FIG. 2. At 205, enterprise UDR 105 sends a register request to NRF 120. The register request is a request for NRF 120 to register enterprise UDR 105. The register request may include a UDR group Identifier (ID), an identification of the stored data/information, and/or an enterprise ID. The enterprise ID may identify the enterprise managing enterprise UDR 105. If enterprise UDR 105 is managed through a cloud provider, the enterprise ID may include an identification of the cloud provider. At 210, NRF 120 sends a register accept to enterprise UDR 105. The register accept is an indication that NRF 120 has registered enterprise UDR 105. The register accept may include the UDR group ID and an identification of the stored data/ information. NRF 120 thereby registers enterprise UDR 105.

At 215, UDR proxy 165 sends a register request to NRF 120. The register request is a request for NRF 120 to register UDR proxy 165. The register request may include a UDR instance ID, Public Land Mobile Network (PLMN) ID, slice ID, and identification of the serving data. At 220, NRF 120 sends a register accept to UDR proxy 165. The register accept may include the UDR instance ID, PLMN ID, slice ID, and identification of the serving data. NRF 120 thereby registers UDR proxy 165.

At 225, network operator 110 sends a register request to NRF 120. The register request may include a UDR group ID, identification of stored data/information, and/or a Communications Service Provider (CSP) ID. At 230, NRF 120 sends a register accept to network operator 110. The register accept may include the UDR group ID, identification of stored data/information, and/or CSP ID.

At 235, NF 135 sends a data (e.g., subscriber information) request to UDM 140. At 240, UDM 140 sends the data request to UDR proxy 165. UDR proxy 165 may perform a local cache search to determine whether a mapping of the requested data is available locally. In this example, the mapping is unavailable locally. At 245, UDR proxy 165 sends, to enterprise UDR 105, a remote search request including a mapping of the data requested to the enterprise subscriber data. At 250, enterprise UDR 105 sends a remote search response to UDR proxy 165. At 255, UDR proxy 165 sends, to network operator 110, a remote search request including a mapping of the data requested to the PLMN subscriber data. At 260, network operator 110 sends a remote search response to UDR proxy 165. At 265, UDR proxy 165 sends a data response to UDM 140. Based on the data response received from UDR proxy 165, UDM 140 may provide an indication to NF 135 as to whether the UE is permitted to access the requested resources/assets.

In this example, the UE subsequently subscribes to a new service with network operator 110. Accordingly, at 270, NF 135 sends an update request to UDM 140. The update request may include updated information regarding the enterprise subscriber data (e.g., the UE's subsequent subscription to the new service). At 275, UDM 140 sends the update request to UDR proxy 165. At 280, UDR proxy 165 sends a remote modify to enterprise UDR 105. The remote modify may include an updated mapping of data requested to the enterprise subscriber data. In response to receiving the remote modify, enterprise UDR 105 may update accordingly for, e.g., auditing or service propagation purposes. At 285, enterprise UDR 105 sends a remote modify response to UDR proxy 165 to acknowledge the update has been successfully performed. At 290, UDR proxy 165 sends an update response to UDM 140 to signal successful completion of the subscription update request.

Figure 3:
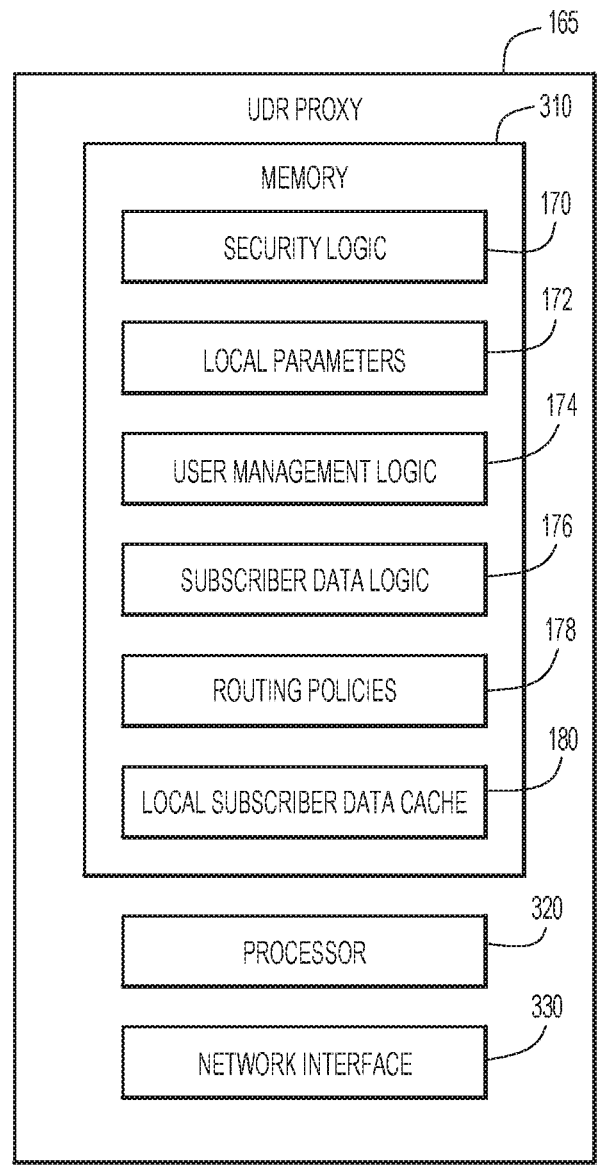
FIG. 3 illustrates a block diagram of a UDR proxy, according to an example embodiment.

FIG. 3 is a simplified block diagram of UDR proxy 165. UDR proxy 165 includes memory 310, one or more processors 320, and network interface 330 that enables network communication. Memory 310 includes security logic 170, local parameters 172, user management logic 174, subscriber data logic 176, routing policies 178, and local subscriber data cache 180. One or more processors 320 are configured to execute instructions stored in memory 310 for UDR proxy 165. When executed by one or more processors 320, instructions stored in memory 310 cause UDR proxy 165 to perform operations described herein.

Memory 310 may be read only memory (ROM), random access memory (RAM), magnetic disk storage media devices, optical storage media devices, flash memory devices, electrical, optical, or other physical/tangible memory storage devices. Thus, in general, memory 310 may be one or more tangible (non-transitory) computer readable storage media (e.g., a memory device) encoded with software comprising computer executable instructions and when the software is executed (by processor 320) it is operable to perform operations described herein.

Network interface 330 is a network interface card (or multiple instances of such a device) or other network interface device that enables network communications on behalf of UDR proxy 165 for sending and receiving network communications as described herein.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described herein may be modified in any manner that accomplishes the functions described herein. In addition, the functions described herein may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Figure 4:
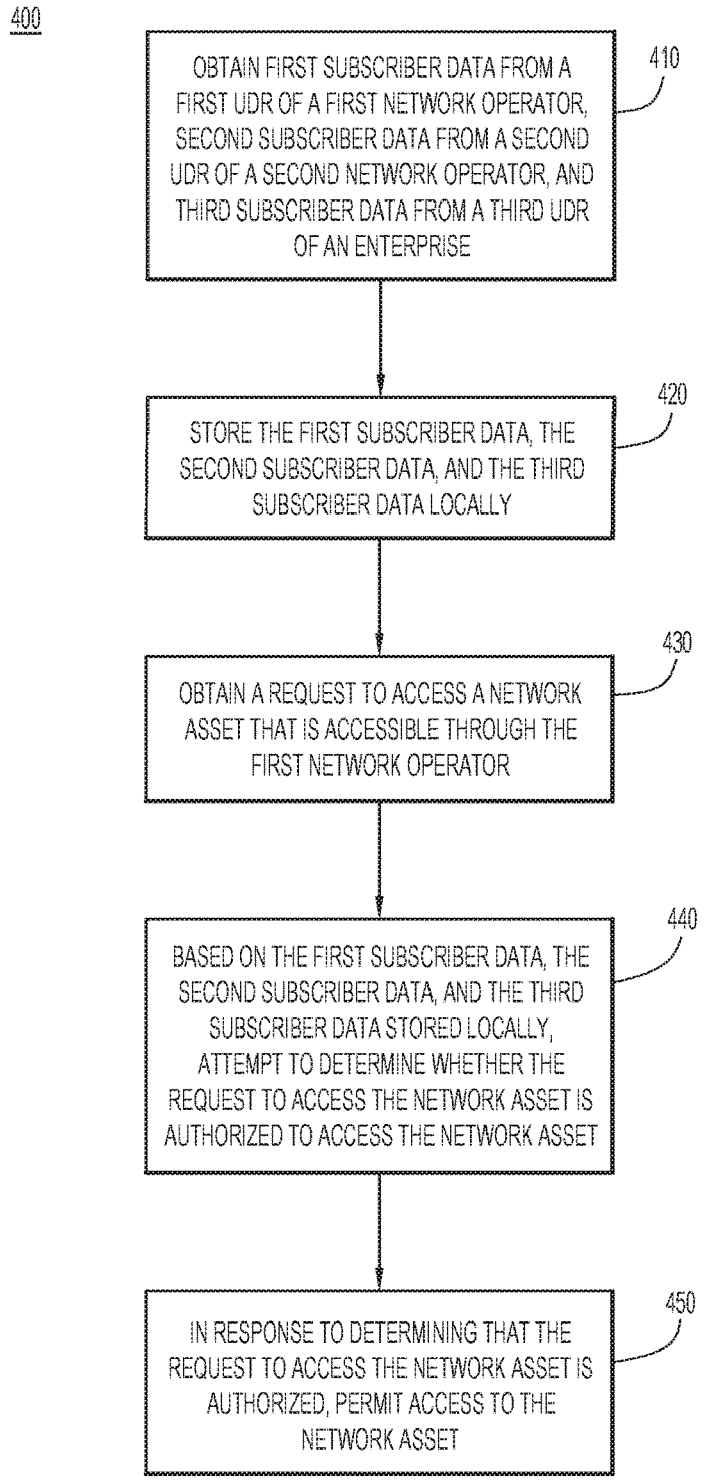
FIG. 4 illustrates a flowchart of a method performed by a UDR proxy, according to an example embodiment.

FIG. 4 is a flowchart of an example method 400 performed by UDR proxy 165. Reference is also made to FIGS. 1 and 2 in connection with the description of FIG. 4. At 410, UDR proxy 165 obtains first subscriber data from a first UDR of a first network operator, second subscriber data from a second UDR of a second network operator, and third subscriber data from a third UDR of an enterprise. At 420, UDR proxy 165 stores the first subscriber data, the second subscriber data, and the third subscriber data locally. At 430, UDR proxy 165 obtains a request to access a network asset that is accessible through the first network operator. At 440, based on the first subscriber data, the second subscriber data, and the third subscriber data stored locally, UDR proxy 165 attempts to determine whether the request to access the network asset is authorized to access the network asset. At 450, in response to determining that the request to access the network asset is authorized, UDR proxy 165 permits access to the network asset.

Techniques are presented for providing subscriber data close to the serving edge which may be retrieved from multiple master sources at the backend. This is advantageous because in Long-Term Evolution (LTE)/Narrowband Internet of Things (NB-IoT) scenarios as well as 5G use cases, subscriber data is expected to be available to support real-time or near real-time access for execution of services. A localized proxy UDR may enable data convergence and unified data management at the edge, thereby enabling operators to provide real-time (or near real-time) and consistent services to users in the multi-network and cloud environment. The edge proxy UDR may support a seamless service experience across legacy cellular technologies, Internet Protocol (IP) Multimedia Services (IMS), Wi-Fi, NB-IoT, 5G, etc. The UDR proxy may simplify subscriber management based on slices and enable CSPs to improve user experience of a server application. The proxy UDR may also enable CSPs to offer subscriber data slices with the requested subscriber data in order to create data openness for data mining and support multiple data analysis models. This model creates virtual silos of the operator's critical subscriber data.

The UDR proxy system may allow control of data access to multiple networks located remotely on geographically distributed subscribers. The UDR proxy may function as an access interface consolidator creating deployment simplification for Network as a Service (NaaS) providers, mobile operators, and CSPs. The UDR proxy may also help create subscriber data localization based on the serving network resource. The UDR proxy caching engine may enable high availability of a backend UDR cluster by creating a function to dynamically load balance the multitenant UDR backend and allow for auto-fail and recovery. The UDR proxy may expose APIs to integrate with the Network Exposure Function (NEF) for localization and backend data consistency. The UDR proxy engine may allow for data consistency across dispersed UDR sources by obtaining the latest subscriber data. The UDR proxy caching may enable synchronization of the subscriber storage content of the data repository tree stored by the UDR and notification of changes to the content.

In one form, a method is provided. The method comprises: at a local UDR proxy: obtaining first subscriber data from a first UDR of a first network operator, second subscriber data from a second UDR of a second network operator, and third subscriber data from a third UDR of an enterprise; storing the first subscriber data, the second subscriber data, and the third subscriber data locally; obtaining a request to access a network asset that is accessible through the first network operator; based on the first subscriber data, the second subscriber data, and the third subscriber data stored locally, attempting to determine whether the request to access the network asset is authorized to access the network asset; and in response to determining that the request to access the network asset is authorized, permitting access to the network asset.

In one example, obtaining the request to access the network asset includes obtaining the request to access the network asset via a network function and a UDM.

In one example, the third UDR is configured to communicate with at least one of the first UDR and the second UDR.

In one example, the method further comprises: in response to determining that the request to access the network asset is not authorized, denying access to the network asset.

In one example, the method further comprises: if it cannot be determined whether the request to access the network asset is authorized based on the first subscriber data, the second subscriber data, and the third subscriber data stored locally, redirecting the request to the first UDR.

In one example, the method further comprises: if it cannot be determined whether the request to access the network asset is authorized based on the first subscriber data, the second subscriber data, and the third subscriber data stored locally, redirecting the request to the third UDR.

In one example, permitting access to the network asset includes permitting access to the network asset via a network manager.

In another form, an apparatus is provided. The apparatus comprises: a network interface configured to enable network communications; and one or more processors coupled to the network interface, wherein the one or more processors are configured to: obtain first subscriber data from a first UDR of a first network operator, second subscriber data from a second UDR of a second network operator, and third subscriber data from a third UDR of an enterprise; store the first subscriber data, the second subscriber data, and the third subscriber data locally; obtain a request to access a network asset that is accessible through the first network operator; based on the first subscriber data, the second subscriber data, and the third subscriber data stored locally, attempt to determine whether the request to access the network asset is authorized to access the network asset; and in response to determining that the request to access the network asset is authorized, permit access to the network asset.

In another form, one or more non-transitory computer readable storage media are provided. The one or more non-transitory computer readable storage media are encoded with instructions that, when executed by a processor of a local UDR proxy, cause the processor to: obtain first subscriber data from a first UDR of a first network operator, second subscriber data from a second UDR of a second network operator, and third subscriber data from a third UDR of an enterprise; store the first subscriber data, the second subscriber data, and the third subscriber data locally; obtain a request to access a network asset that is accessible through the first network operator; based on the first subscriber data, the second subscriber data, and the third subscriber data stored locally, attempt to determine whether the request to access the network asset is authorized to access the network asset; and in response to determining that the request to access the network asset is authorized, permit access to the network asset.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a local Unified Data Repository (UDR) proxy:
   obtaining first subscriber data from a first UDR of a first network operator, second subscriber data from a second UDR of a second network operator, and third subscriber data from a third UDR of an enterprise;
   storing the first subscriber data, the second subscriber data, and the third subscriber data locally;
   obtaining a request to access a network asset that is accessible through the first network operator;
   based on the first subscriber data, the second subscriber data, and the third subscriber data stored locally, attempting to determine whether the request to access the network asset is authorized to access the network asset; and
   in response to determining that the request to access the network asset is authorized, permitting access to the network asset.

2. The method of claim 1, wherein obtaining the request to access the network asset includes obtaining the request to access the network asset via a network function and a Unified Data Manager (UDM).

3. The method of claim 1, wherein the third UDR is configured to communicate with at least one of the first UDR and the second UDR.

4. The method of claim 1, further comprising:
   in response to determining that the request to access the network asset is not authorized, denying access to the network asset.

5. The method of claim 1, further comprising:
   if it cannot be determined whether the request to access the network asset is authorized based on the first subscriber data, the second subscriber data, and the third subscriber data stored locally, redirecting the request to the first UDR.

6. The method of claim 1, further comprising:
   if it cannot be determined whether the request to access the network asset is authorized based on the first subscriber data, the second subscriber data, and the third subscriber data stored locally, redirecting the request to the third UDR.

7. The method of claim 1, wherein permitting access to the network asset includes permitting access to the network asset via a network manager.

8. An apparatus comprising:
   a network interface configured to enable network communications; and
   one or more processors coupled to the network interface, wherein the one or more processors are configured to:
   obtain first subscriber data from a first Unified Data Repository (UDR) of a first network operator, second subscriber data from a second UDR of a second network operator, and third subscriber data from a third UDR of an enterprise;
   store the first subscriber data, the second subscriber data, and the third subscriber data locally;
   obtain a request to access a network asset that is accessible through the first network operator;
   based on the first subscriber data, the second subscriber data, and the third subscriber data stored locally, attempt to determine whether the request to access the network asset is authorized to access the network asset; and
   in response to determining that the request to access the network asset is authorized, permit access to the network asset.

9. The apparatus of claim 8, wherein the one or more processors are further configured to:
   obtain the request to access the network asset via a network function and a Unified Data Manager (UDM).

10. The apparatus of claim 8, wherein the third UDR is configured to communicate with at least one of the first UDR and the second UDR.

11. The apparatus of claim 8, wherein the one or more processors are further configured to:
    in response to determining that the request to access the network asset is not authorized, deny access to the network asset.

12. The apparatus of claim 8, wherein the one or more processors are further configured to:
    if it cannot be determined whether the request to access the network asset is authorized based on the first subscriber data, the second subscriber data, and the third subscriber data stored locally, redirect the request to the first UDR.

13. The apparatus of claim 8, wherein the one or more processors are further configured to:
    if it cannot be determined whether the request to access the network asset is authorized based on the first subscriber data, the second subscriber data, and the third subscriber data stored locally, redirect the request to the third UDR.

14. The apparatus of claim 8, wherein the one or more processors are further configured to:
    permit access to the network asset via a network manager.

15. One or more non-transitory computer readable storage media encoded with instructions that, when executed by a processor of a local Unified Data Repository (UDR) proxy, cause the processor to:
- obtain first subscriber data from a first UDR of a first network operator, second subscriber data from a second UDR of a second network operator, and third subscriber data from a third UDR of an enterprise;
- store the first subscriber data, the second subscriber data, and the third subscriber data locally;
- obtain a request to access a network asset that is accessible through the first network operator;
- based on the first subscriber data, the second subscriber data, and the third subscriber data stored locally, attempt to determine whether the request to access the network asset is authorized to access the network asset; and
- in response to determining that the request to access the network asset is authorized, permit access to the network asset.

16. The one or more non-transitory computer readable storage media of claim 15, wherein the instructions further cause the processor to:
- obtain the request to access the network asset via a network function and a Unified Data Manager (UDM).

17. The one or more non-transitory computer readable storage media of claim 15, wherein the third UDR is configured to communicate with at least one of the first UDR and the second UDR.

18. The one or more non-transitory computer readable storage media of claim 15, wherein the instructions further cause the processor to:
- in response to determining that the request to access the network asset is not authorized, deny access to the network asset.

19. The one or more non-transitory computer readable storage media of claim 15, wherein the instructions further cause the processor to:
- if it cannot be determined whether the request to access the network asset is authorized based on the first subscriber data, the second subscriber data, and the third subscriber data stored locally, redirect the request to the first UDR.

20. The one or more non-transitory computer readable storage media of claim 15, wherein the instructions further cause the processor to:
- if it cannot be determined whether the request to access the network asset is authorized based on the first subscriber data, the second subscriber data, and the third subscriber data stored locally, redirect the request to the third UDR.

* * * * *